US011895752B2

(12) United States Patent
Sterling

(10) Patent No.: US 11,895,752 B2
(45) **Date of Patent: *Feb. 6, 2024**

(54) SMART LAMP SYSTEM AND METHOD

(71) Applicant: BNSF Railway Company, Fort Worth, TX (US)

(72) Inventor: Ross Martin Sterling, Gardner, KS (US)

(73) Assignee: BNSF Railway Company, Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/055,247

(22) Filed: Nov. 14, 2022

(65) Prior Publication Data

US 2023/0269847 A1 Aug. 24, 2023

Related U.S. Application Data

(63) Continuation of application No. 17/679,575, filed on Feb. 24, 2022, now Pat. No. 11,510,298.

(51) Int. Cl.

| | |
|---|---|
| ***H05B 45/50*** | (2022.01) |
| ***H05B 47/185*** | (2020.01) |
| ***H05B 47/155*** | (2020.01) |

(52) U.S. Cl.

CPC ........... *H05B 45/50* (2020.01); *H05B 47/185* (2020.01); *H05B 47/155* (2020.01)

(58) Field of Classification Search

None

See application file for complete search history.

(56) References Cited

U.S. PATENT DOCUMENTS

| | | | |
|---|---|---|---|
| 6,222,446 | B1 | 4/2001 | Hilleary |
| 7,154,403 | B2 | 12/2006 | Davenport et al. |

(Continued)

FOREIGN PATENT DOCUMENTS

| | | | |
|---|---|---|---|
| EP | 2030862 | A1 | 3/2009 |
| EP | 2857277 | A1 | 4/2015 |

(Continued)

OTHER PUBLICATIONS

N/A, Communications and signaling equipment and warning devices., Jun. 1, 2003.

Charles Z.K. Chen, Harry Hsiao, How to Make Railroad Crossings Safer and Smarter, Mar. 1, 2017.

(Continued)

*Primary Examiner* — Anh Q Tran

(74) *Attorney, Agent, or Firm* — Whitaker Chalk Swindle & Schwartz, PLLC; Enrique Sanchez, Jr.

(57) ABSTRACT

A smart lamp system and method for monitoring a status of light-emitting diodes (LEDs). The system can provide LED status monitoring using a logic controller communicating with at least one strip of LEDs. The system can utilize the logic controller to assign a unique identifier (ID) to the at least one strip of LEDs based on a physical position of a plurality of dual-inline package (DIP) switches incorporated within a smart lamp housing. The system can provide a hardware architecture to interface the logic controller with a power-line communication (PLC) transceiver. The system can establish a communication protocol between the PLC transceiver and a PLC receiver to efficiently communicate the statuses of the LEDs. The logic controller can generate a payload including a binary representation of the unique ID of the smart lamp and the statuses of the LEDs and transmit the payload to the PLC transceiver.

20 Claims, 7 Drawing Sheets

(56) References Cited

U.S. PATENT DOCUMENTS

| | | | |
|---|---|---|---|
| 7,586,421 | B2 | 9/2009 | Witte et al. |
| 8,058,815 | B1 | 11/2011 | Hardy |
| 8,717,194 | B2 | 5/2014 | Nguyen et al. |
| 9,420,674 | B2 | 8/2016 | Hartman et al. |
| 9,610,959 | B2 | 4/2017 | Pless et al. |
| 10,152,881 | B2 | 12/2018 | Mubarek et al. |
| 10,477,650 | B2 | 11/2019 | Wray |
| 11,510,298 | B1 * | 11/2022 | Sterling ................. H05B 45/50 |
| 2007/0188427 | A1 | 8/2007 | Lys et al. |
| 2019/0185034 | A1 | 6/2019 | Smith et al. |
| 2019/0297709 | A1 | 9/2019 | Hirauchi et al. |
| 2019/0329802 | A1 | 10/2019 | Beier et al. |
| 2019/0351920 | A1 | 11/2019 | Barra et al. |
| 2021/0070330 | A1 | 3/2021 | McGavock, Jr. et al. |
| 2021/0086809 | A1 | 3/2021 | Honeck et al. |
| 2021/0086811 | A1 | 3/2021 | Fox et al. |
| 2021/0237785 | A1 | 8/2021 | McGavock, Jr. et al. |

FOREIGN PATENT DOCUMENTS

| | | | |
|---|---|---|---|
| EP | 3738856 | A1 | 11/2020 |
| WO | 2003067933 | A1 | 8/2003 |

OTHER PUBLICATIONS

Wei-Hsun Lee and Chi-Yi Chiu, Design and Implementation of a Smart Traffic Signal Control System for Smart City Applications, Jan. 16, 2020.

Paula Fraga-Lamas *, Tiago M. Fernández-Caramés and Luis Castedo, Towards the Internet of Smart Trains: A Review on Industrial IoT-Connected Railways, Jun. 21, 2017.

* cited by examiner

SMART LAMP SYSTEM AND METHOD

CROSS-REFERENCE TO RELATED APPLICATIONS

The present application is a Continuation of U.S. patent application Ser. No. 17/679,575, filed Feb. 24, 2022, the entirety of which is hereby incorporated by reference for all purposes.

TECHNICAL FIELD

The present disclosure relates generally to light-emitting diode (LED) lamps, and more particularly to a smart lamp system and method for monitoring a status of LEDs.

BACKGROUND

Traditional incandescent crossing flashers utilize a light-out detection device (LOD) equipped with an amperage clamp that effectively measures current draw upon activation. The LOD devices available today are ineffective with LED lamps as the current draw needed to illuminate the LED nodes is much lower than the current draw needed to illuminate an incandescent bulb. Various attempts have been made to retrofit LOD devices with LED flashers with unfavorable results.

While incandescent bulbs when paired with an LOD device provide increased monitoring of operation, LED lamps provide greater visibility to motorists and pedestrians. Additionally, LED lamps do not utilize a filament for operation effectively providing greater lifecycles versus traditional incandescent bulbs. LED lamps are a long-term solution that provide superior lumen output over a broader focal point. Unfortunately, accurate and dependable light-out detection for LED units has not been realized.

SUMMARY

The present disclosure achieves technical advantages as a smart lamp system and method for monitoring a status of LEDs. The system can provide LED status monitoring using a logic controller communicating with at least one strip of LEDs. The system can utilize the logic controller to assign a unique identifier (ID) to the at least one strip of LEDs based on a physical position of a plurality of dual-inline package (DIP) switches incorporated within a smart lamp housing. The system can provide a hardware architecture to interface the logic controller with a transceiver. The transceiver can be provide receipt and transmission of data signals. In one embodiment, the transceiver can be a power-line communication (PLC) transceiver. In another embodiment, the same electrical wires used to power the smart lamp are used for communicating the statuses of the LEDs between the logic controller and the PLC transceiver. The system can establish a communication protocol between the PLC transceiver and a PLC receiver to efficiently communicate the statuses of the LEDs. For example, in response to a triggering event, the PLC transceiver can activate the logic controller to provide power to the strip of LEDs. The logic controller can generate a payload including a binary representation of the unique ID of the smart lamp and the statuses of the LEDs and transmit the payload to the PLC transceiver. The PLC transceiver can generate a message frame corresponding to the communication protocol including the payload, where the timing of the message frame can be based on a delay corresponding to the position of the DIP switches.

Accordingly, the present disclosure provides the technological benefit of monitoring statuses of LEDs using a logic controller to generate a payload compliant with a plurality of communication protocols. The firmware of the logic controller can include custom designed firmware applications to instantiate the logic controller, control the LEDs, and efficiently time the communication between the various hardware components. The present disclosure can be implemented anywhere LED lamps can be utilized, including, vehicle headlights, signaling devices, and lighting components, among others.

The present disclosure provides a technological solution missing from conventional systems by at least providing a method using power-line communications able to detect functionality of LEDs unseen in conventional approaches. The present disclosure transforms a physical state of the LEDs to logical values based on a state machine programmed within the logic controller corresponding to the statuses of the LEDs. The present disclosure surpasses the conventional approaches by providing an ability to monitor the statuses of LEDs previously undetectable and by providing a power consumption efficient for modern lighting solutions. The present disclosure avoids adding strain on an already overspent system by providing at least the following functionality:

- Monitoring various states of LEDs using a combination of power-line communications and electrical hardware.
- Providing a communication protocol to monitor the states of LEDs.
- Generating an alert in response to a state of the LEDs indicating LED inoperability.

It is an object of the invention to provide a smart lamp system configured to monitor a status of LEDs. It is a further object of the invention to provide a method for monitoring a status of LEDs. It is a further object of the invention to provide a computer-implemented method for monitoring a status of LEDs. It is a further object to provide a smart flasher system configured to monitor the status of LED flashers. These and other objects are provided by at least the following embodiments.

In one embodiment, a smart lamp system configured to monitor a status of light-emitting diodes (LEDs) can include: a plurality of dual-inline package (DIP) switches configured to represent an identifier of at least one LED strip; a power-line transceiver configured to transmit statuses of the at least one LED strip and DIP switch positions via power-line communications utilizing voltage feed lines powering the smart lamp; a memory for storing the DIP switch positions, the statuses, and configuration enabling information; and a processor coupled to the plurality of DIP switches, the power-line transceiver, the at least one LED strip, and the memory, configured to monitor the statuses of the at least one LED strip, by performing the steps of: monitoring the voltage, current, and DIP switch arrangement; and transmitting lamp information externally from the lamp. Wherein the DIP switch position corresponds to a unique identifier (ID) of the smart lamp, left or right position of the smart lamp, and establishes a time delay for message transmission. Wherein the plurality of DIP switches includes at least seven DIP switches. Wherein the statuses include all LED strips are inoperable, a first LED strip is operable and a second LED strip is inoperable, the first LED strip is inoperable and the second LED strip is operable, and the first LED strip is operable and the second LED strip is operable. Wherein the processor is further configured to perform the step of assigning a smart lamp configuration based on the DIP switch arrangement. Wherein the processor is further configured to perform the step of identifying a status of the at least one LED strip, wherein the lamp information includes the status. Wherein the processor is further configured to perform the step of detecting an activation failure.

In another embodiment, a method for monitoring a status of light-emitting diodes (LEDs) can include: representing an identifier of at least one LED strip; transmitting statuses of the at least one LED strip and dual-inline package (DIP) switch positions via power-line communications utilizing voltage feed lines powering a smart lamp; monitoring a voltage, a current, and DIP switch arrangements of a plurality of DIP switches; and transmitting lamp information to a power-line transceiver. Wherein the DIP switch position corresponds to a unique identifier (ID) of the smart lamp, left or right position of the smart lamp, and establishes a time delay for message transmission. Wherein the plurality of DIP switches includes at least seven DIP switches. Wherein the statuses include all LED strips are inoperable, a first LED strip is operable and a second LED strip is inoperable, the first LED strip is inoperable and the second LED strip is operable, and the first LED strip is operable and the second LED strip is operable. Wherein the method further comprising assigning a smart lamp configuration based on the DIP switch arrangement. Wherein the method further comprising identifying a status of the at least one LED strip, wherein the lamp information includes the status. Wherein the method further comprising detecting an activation failure.

In another embodiment, a computer-implemented method for monitoring a status of light-emitting diodes (LEDs) can include: representing an identifier of at least one LED strip; transmitting statuses of the at least one LED strip and dual-inline package (DIP) switch positions via power-line communications utilizing voltage feed lines powering a smart lamp; monitoring a voltage, a current, and DIP switch arrangements of a plurality of DIP switches; and transmitting lamp information to a power-line transceiver. Wherein the DIP switch position corresponds to a unique identifier (ID) of the smart lamp, left or right position of the smart lamp, and establishes a time delay for message transmission. Wherein the plurality of DIP switches includes at least seven DIP switches. Wherein the statuses include all LED strips are inoperable, a first LED strip is operable and a second LED strip is inoperable, the first LED strip is inoperable and the second LED strip is operable, and the first LED strip is operable and the second LED strip is operable. Wherein the computer-implemented method further comprising assigning a smart lamp configuration based on the DIP switch arrangement. Wherein the computer-implemented method further comprising identifying a status of the at least one LED strip, wherein the lamp information includes the status. Wherein the computer-implemented method further comprising detecting an activation failure.

In another embodiment, a smart flasher system configured to monitor the status of LED flashers, can include: a processor operably coupled to at least one LED strip; a plurality of dual-inline package (DIP) switches operably coupled to the processor; and a power-line transceiver configured to transmit statuses and DIP switch positions to a wayside device via power-line communications utilizing the same voltage feed lines powering the smart flasher. Wherein the processor monitors the voltage, current, and DIP switch arrangement and transmits flasher information to the wayside device. Wherein the DIP switch position sets a unique identification number, left or right position, and establishes a time delay for message transmission. Wherein the processor is operably coupled to at least seven DIP switches.

BRIEF DESCRIPTION OF THE DRAWINGS

The present disclosure will be readily understood by the following detailed description, taken in conjunction with the accompanying drawings that illustrate, by way of example, the principles of the present disclosure. The drawings illustrate the design and utility of one or more exemplary embodiments of the present disclosure, in which like elements are referred to by like reference numbers or symbols. The objects and elements in the drawings are not necessarily drawn to scale, proportion, or precise positional relationship. Instead, emphasis is focused on illustrating the principles of the present disclosure.

DETAILED DESCRIPTION

The disclosure presented in the following written description and the various features and advantageous details thereof, are explained more fully with reference to the non-limiting examples included in the accompanying drawings and as detailed in the description, which follow. Descriptions of well-known components have been omitted to not unnecessarily obscure the principal features described herein. The examples used in the following description are intended to facilitate an understanding of the ways in which the disclosure can be implemented and practiced. A person of ordinary skill in the art would read this disclosure to mean that any suitable combination of the functionality or exemplary embodiments below could be combined to achieve the subject matter claimed. The disclosure includes either a representative number of species falling within the scope of the genus or structural features common to the members of the genus so that one of ordinary skill in the art can visualize or recognize the members of the genus. Accordingly, these examples should not be construed as limiting the scope of the claims.

Figure 1:
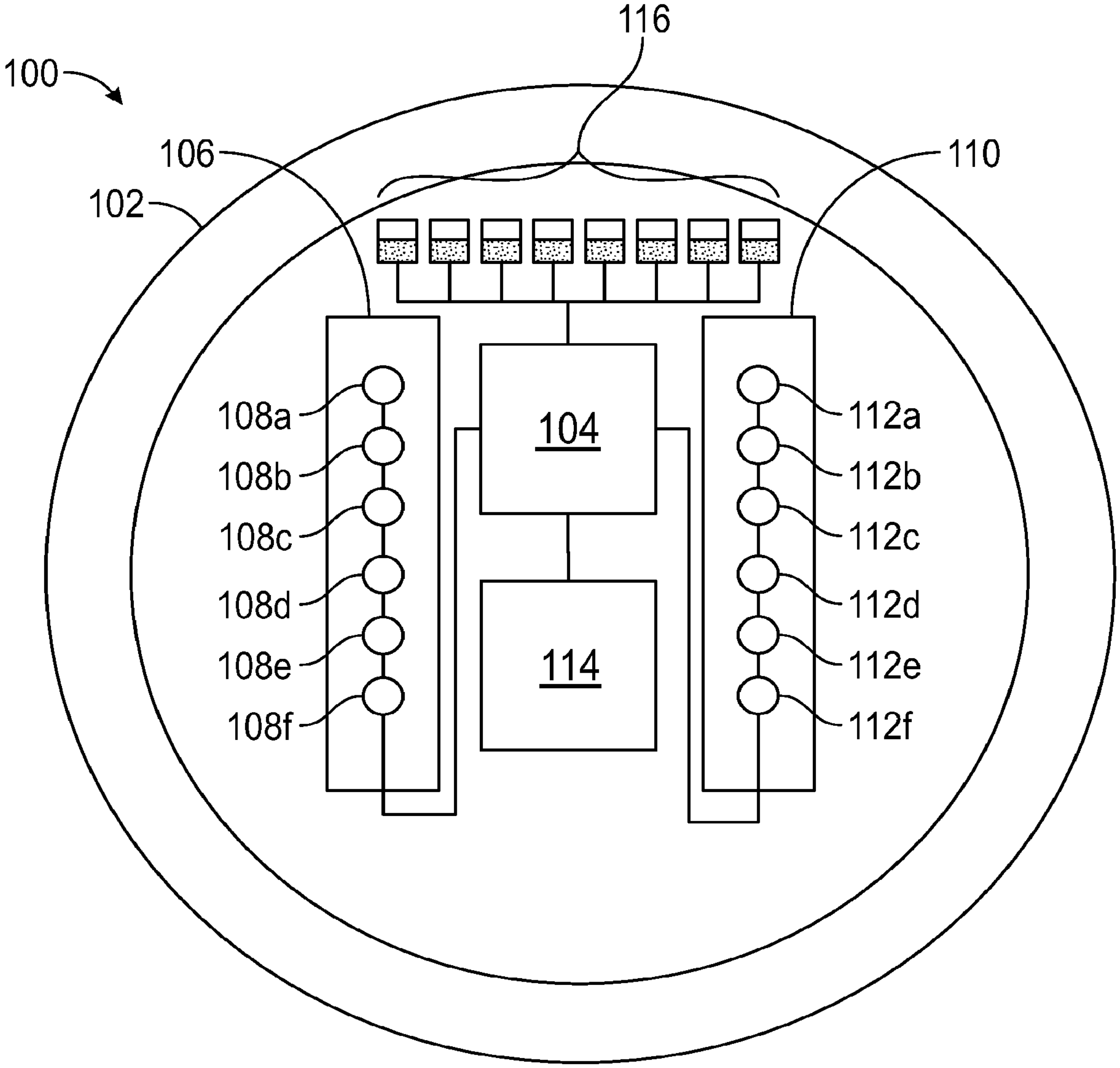
FIG. 1 illustrates a smart lamp system, in accordance with one or more exemplary embodiments of the present disclosure.

FIG. 1 illustrates an exemplary embodiment of a smart lamp system 100. The system 100 can include a lamp component 102, a processor 104, a first LED strip 106, a first plurality of LEDs 108*a*-108*f*, a second LED strip 110, a second plurality of LEDs 112*a*-112*f*, a PLC transceiver 114, and DIP switches 116.

The lamp component 102, in an embodiment, can include a reflective covering to illuminate a surrounding environment. For example, the lamp component 102 can include a reflective material sufficient for oncoming travelers to identify the system 100. In another embodiment, the lamp component 102 can include a housing encompassing the lamp components. For example, at least a portion of the housing can be translucent, allowing illumination from the LEDs 112*a*-112*f* to exit the housing. Further, the lamp component 102 can include input/output connection points to allow for ease of removal or replacement of the lamp component 102.

The processor 104, in an embodiment, can include any device to perform logic processing. For example, the processor 104 can include a microprocessor programmable to include software programs to interface and control various components of the system 100. In an example, the microprocessor can include a RASPBERRY PI, ARDUINO, or another type of microprocessor. In another example, the processor 104 can be coupled to the first LED strip 106, the second LED strip 110, the PLC transceiver 114, and the DIP switches 116. In an example, the components of the system 100 can be independent of another. For example, the processor 104 can be housed within a ruggedized housing unit independent of the first LED strip 106 and the second LED strip 110.

In another example, the processor 104 can receive statuses of the first LED strip 106 and the second LED strip 110. For example, the statuses can indicate whether the first LED strip 106 and the second LED strip 110 are operating normally. In an example, the statuses can indicate whether the first LED strip 106 or the second LED strip 110 are inoperable. In an example, the statuses can indicate whether the first LED strip 106 and the second LED strip 110 are inoperable. The processor 104 can generate a communication payload based on the statuses of the first LED strip 106 and the second LED strip 110. For example, the processor 104 can include a state machine to convert the statuses to binary representation. In an example, the binary representation can be as follows.

| State | Binary | Meaning |
|---|---|---|
| 0 | 00 | Both LED strips are inoperable |
| 1 | 01 | The first LED string 106 is inoperable, the second LED string 110 is operable |
| 2 | 10 | The first LED string 106 is operable, the second LED string 110 is inoperable |
| 3 | 11 | The first LED string 106 is operable, the second LED string 110 is operable |

In another example, the processor 104 can generate a communication payload corresponding to the statuses. For example, the processor 104 can perform various protocol actions across a time window. The protocol actions can include wakeup, delay, transmission, and silence. The wakeup action can include the system 100 receives power, performs self-diagnostic checks, and prepares the system 100 for transmitting over the power line. The delay can include activation of a communication timing delay based on a position of the DIP switches 116 and standby to transmit a message. The transmission can include an end to the delay and the system 100 transmits the ID and the statuses. The silence can include a standby to lose power when the time window ends. The time window can include a 1 second duration.

The first LED strip 106, in an embodiment, can include a housing for the first plurality of LEDs 108*a*-108*f*. For example, the first LED strip 106 can include independent structures for each of the first plurality of LEDs 108*a*-108*f* In an example, the first LED strip 106 can include electrical hardware/connections (not shown) to power the first LED strip 106. For example, the first LED strip 106 can receive between 9 and 16 volts (V) either alternating current (AC) or direct current (DC). In another example, the LED strip 106 can include non-polarity sensitive hardware. In another example, the first LED strip 106 can transmit statuses corresponding to the first plurality of LEDs 108*a*-108*f* to the processor 104. For example, the statuses can include the first LED strip 106 is either operable or inoperable. The first LED strip 106 can indicate the first plurality of LEDs 108*a*-108*f* are operable when at least one of the first plurality of LEDs 108*a*-108*f* are operating normally. The first LED strip 106 can indicate the first plurality of LEDs 108*a*-108*f* are inoperable when none of the first plurality of LEDs 108*a*-108*f* are operating normally.

The first plurality of LEDs 108*a*-108*f*, in an embodiment, can include LEDs of various colors and manufacturing capabilities. For example, the first plurality of LEDs 108*a*-108*f* can include at least one LED. In an example, the first plurality of LEDs 108*a*-108*f* can each be coupled in series. In another example, the first plurality of LEDs 108*a*-108*f* can each be coupled in parallel.

The second LED strip 110, in an embodiment, can include a housing for the second plurality of LEDs 112*a*-112*f* For example, the second LED strip 110 can include independent structures for each of the second plurality of LEDs 112*a*-112*f* In an example, the second LED strip 110 can include electrical hardware (not shown) to power the second LED strip 110.

The second plurality of LEDs 112*a*-112*f*, in an embodiment, can include LEDs of various colors and manufacturing capabilities. For example, the second plurality of LEDs 112*a*-112*f* can include at least one LED. In an example, the second plurality of LEDs 112*a*-112*f* can each be coupled in series. In another example, the second plurality of LEDs 112*a*-112*f* can each be coupled in parallel.

The PLC transceiver 114, in an embodiment, can transmit data on a conductive wire that is also used for power transmission. For example, the PLC transceiver 114 can transmit statuses of the first LED strip 106 and the second LED strip 110 and positions of the DIP switches 116 via power-line communications utilizing voltage feed lines powering the smart lamp. The voltage feed lines can include AC power transmission. In an example, the voltage feed lines can include DC power transmission and the PLC transceiver 114 can include a converter hardware to convert the DC power for data communications (i.e., modulate the DC power corresponding to bits of the data communications). In another example, the PLC transceiver 114 can operate by adding a modulated carrier signal to the power line. For example, the power line transmitting power to the system 100 can include the modulated carrier signal at a particular frequency. The particular frequency can include a narrowband, a low speed narrowband, and a medium speed narrowband. In an example, the narrowband can include a data rate of 20 bits per second (bit/s). For example, the narrowband can include industry standard protocols such as X10, Consumer Electronics Bus (CEBus), Local Operating Networks (LonWorks), a custom protocol, or another relevant industry standard protocol. The low speed narrowb and can include a data rate of 200 to 1200 bit/s. For example, the low speed narrowband can include industry standard protocols such as IEC 61334, Open Smart Grid Protocol (OSGP), ETSI 103 908, a custom protocol, or another relevant industry standard protocol. The medium speed narrowband can include a data rate of up to 576 kilobits per second (kbit/s). For example, the medium speed narrowband can include industry standard protocols such as G3-PLC (ITU G.9903), a custom protocol, or another relevant industry standard protocol.

In an example, the PLC transceiver 114 can include a wiring schematic coupled to a power source. The wiring schematic can include a first terminal and a second terminal. For example, the first terminal can include a source or a drain and the second terminal can include an alternating source. The alternating source can alter a polarity of a source corresponding with time. For example, for a first duration the alternating source can transmit a positive current or voltage and for a second duration the alternating source can transmit a negative current or voltage. In another example, the PLC transceiver 114 and the processor 104 can be on a single printed circuit board as modules or independent devices.

The DIP switches 116, in an embodiment, can include a manual electric switch that is packaged with others in a group in a standard dual in-line package. In an example, the DIP switches 116 can be used on a printed circuit board along with other electronic components and can be used to customize the behavior of an electronic device for specific situations. In an example, the DIP switches 116 can represent an identifier of the first LED strip 106 and the second LED strip 110. In an example, the DIP switches 116 can correspond to various positions. For example, the switch positions can correspond to a unique ID of the system 100. As illustrated in FIG. 1, the position of switches is represented based on a position of the white box for each of the DIP switches 116, either up or down. In an example, with all switches in the down position ("0"), the system 100 will not report any status. In another example, the first switch of the DIP switches 116 can correspond to a physical position of the system 100. For example, the system 100 can be on a right side or a left side relative to a reference point. In an example, the system 100 on the left side can include the first switch to be in an up position ("1") indicating a left lamp. In another example, the system 100 on the right side can include the first switch to be in the down position indicating a right lamp. The remaining switches can be used for an identifier (ID) and a time delay value, which can be used for timing of communication. In an example, the DIP switches 116 can include at least seven DIP switches.

Figure 2:
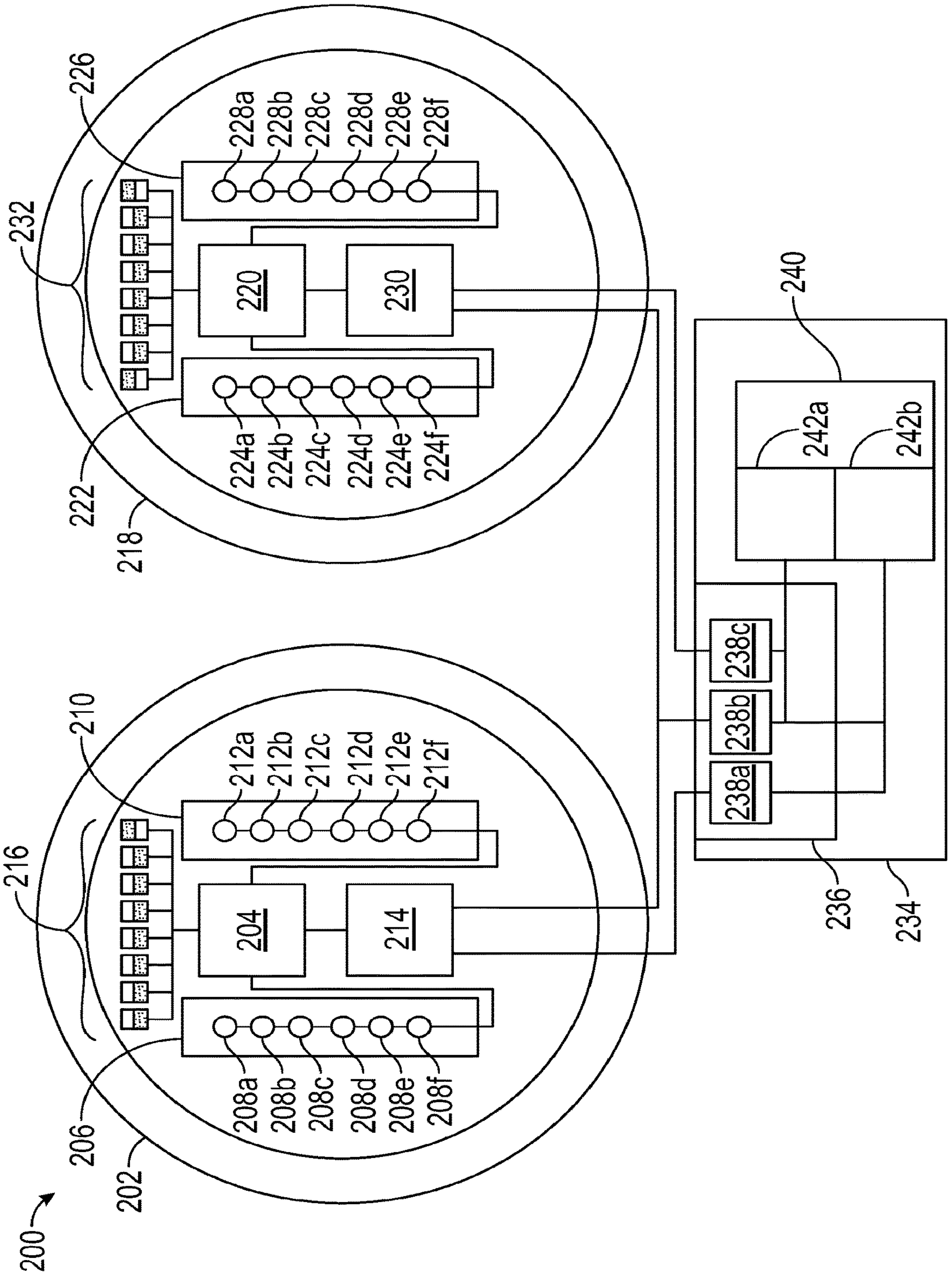
FIG. 2 illustrates a smart lamp communication system, in accordance with one or more exemplary embodiments of the present disclosure.

FIG. 2 illustrates an exemplary embodiment of a smart lamp communication system 200. The system 200 can include a first lamp component 202, a first processor 204, a first LED strip 206, a first plurality of LEDs 208*a*-208*f*, a second LED strip 210, a second plurality of LEDs 212*a*-212*f*, a first PLC transceiver 214, a first DIP switches 216, a second lamp component 218, a second processor 220, a third LED strip 222, a third plurality of LEDs 224*a*-224*f*, a fourth LED strip 226, a fourth plurality of LEDs 228*a*-228*f*, a second PLC transceiver 230, a second DIP switches 232, a signal bungalow 234 including a surge panel 236, terminals 238*a*-238*c*, a PLC receiver 240, and mast inputs 242*a*-242*b*.

The first lamp component 202, in an embodiment, can include a reflective covering to illuminate a surrounding environment. For example, the first lamp component 202 can include a reflective material sufficient for oncoming travelers to identify the system 200.

The first processor 204, in an embodiment, can include any device to perform logic processing. For example, the first processor 204 can include a microprocessor programmable to include software programs to interface and control various components of the system 200. In an example, the microprocessor can include a RASPBERRY PI, ARDUINO, or another type of microprocessor. In another example, the first processor 204 can be coupled to the first LED strip 206, the second LED strip 210, the first PLC transceiver 214, and the first DIP switches 216. In an example, the components of the system 200 can be independent of another. For example, the first processor 204 can be housed within a ruggedized housing unit independent of the first LED strip 206 and the second LED strip 210.

In another example, the first processor 204 can receive statuses of the first LED strip 206 and the second LED strip 210. For example, the statuses can indicate whether the first LED strip 206 and the second LED strip 210 are operating normally. In an example, the statuses can indicate whether the first LED strip 206 or the second LED strip 210 are inoperable. In an example, the statuses can indicate whether the first LED strip 206 and the second LED strip 210 are inoperable. The first processor 204 can generate a communication payload based on the statuses of the first LED strip 206 and the second LED strip 210. For example, the first processor 204 can include a state machine to convert the statuses to binary representation. In an example, the binary representation can be as follows.

| State | Binary | Meaning |
|---|---|---|
| 0 | 00 | All LED strips are inoperable |
| 1 | 01 | The first LED string 106 is inoperable, the second LED string 110 is operable |
| 2 | 10 | The first LED string 106 is operable, the second LED string 110 is inoperable |
| 3 | 11 | The first LED string 106 is operable, the second LED string 110 is operable |

In another example, the first processor 204 can generate a communication payload corresponding to the statuses. For example, the first processor 204 can perform various protocol actions across a time window. The protocol actions can include wakeup, delay, transmission, and silence. The wakeup action can include the system 200 receives power, performs self-diagnostic checks, and prepares the system 200 for transmitting over the power line. The delay can include activation of a communication timing delay based on a position of the first DIP switches 216 and standby to transmit a message. The transmission can include an end to the delay and the system 200 transmits the ID and the statuses. The silence can include a standby to lose power when the time window ends. The time window can include a 1 second duration.

The first LED strip 206, in an embodiment, can include a housing for the first plurality of LEDs 208*a*-208*f*. For example, the first LED strip 206 can include independent structures for each of the first plurality of LEDs 208*a*-208*f* In an example, the first LED strip 206 can include electrical hardware (not shown) to power the first LED strip 206. For example, the first LED strip 206 can receive between 9 and 16 volts (V) either alternating current (AC) or direct current (DC). In another example, the LED strip 106 can include non-polarity sensitive hardware. In another example, the first LED strip 206 can transmit statuses corresponding to the first plurality of LEDs 208*a*-208*f* to the first processor 204. For example, the statuses can include the first LED strip

206 is either operable or inoperable. The first LED strip 206 can indicate the first plurality of LEDs 208*a*-208*f* are operable when at least one of the first plurality of LEDs 208*a*-208*f* are operating normally. The first LED strip 206 can indicate the first plurality of LEDs 208*a*-208*f* are inoperable when none of the first plurality of LEDs 208*a*-208*f* are operating normally.

The first plurality of LEDs 208*a*-208*f*, in an embodiment, can include LEDs of various colors and manufacturing capabilities. For example, the first plurality of LEDs 208*a*-208*f* can include at least one LED. In an example, the first plurality of LEDs 208*a*-208*f* can each be coupled in series. In another example, the first plurality of LEDs 208*a*-208*f* can each be coupled in parallel.

The second LED strip 210, in an embodiment, can include a housing for the second plurality of LEDs 212*a*-212*f* For example, the second LED strip 210 can include independent structures for each of the second plurality of LEDs 212*a*-212*f* In an example, the second LED strip 210 can include electrical hardware (not shown) to power the second LED strip 210.

The second plurality of LEDs 212*a*-212*f*, in an embodiment, can include LEDs of various colors and manufacturing capabilities. For example, the second plurality of LEDs 212*a*-212*f* can include at least one LED. In an example, the second plurality of LEDs 212*a*-212*f* can each be coupled in series. In another example, the second plurality of LEDs 212*a*-212*f* can each be coupled in parallel.

The first PLC transceiver 214, in an embodiment, can transmit data on a conductive wire that is also used for power transmission. For example, the first PLC transceiver 214 can transmit statuses of the first LED strip 206 and the second LED strip 210 and positions of the first DIP switches 216 via power-line communications utilizing voltage feed lines powering the smart lamp. The voltage feed lines can include AC power transmission. In an example, the voltage feed lines can include DC power transmission and the first PLC transceiver 214 can include a converter hardware to convert the DC power for data communications (i.e., modulate the DC power corresponding to bits of the data communications). In another example, the first PLC transceiver 214 can operate by adding a modulated carrier signal to the power line. For example, the power line transmitting power to the system 200 can include the modulated carrier signal at a particular frequency. The particular frequency can include a narrowband, a low speed narrowband, and a medium speed narrowband. In an example, the narrowband can include a data rate of 20 bits per second (bit/s). For example, the narrowband can include industry standard protocols such as X10, Consumer Electronics Bus (CEBus), Local Operating Networks (LonWorks), a custom protocol, or another relevant industry standard protocol. The low speed narrowband can include a data rate of 200 to 1200 bit/s. For example, the low speed narrowband can include industry standard protocols such as IEC 61334, Open Smart Grid Protocol (OSGP), ETSI 103 908, a custom protocol, or another relevant industry standard protocol. The medium speed narrowband can include a data rate of up to 576 kilobits per second (kbit/s). For example, the medium speed narrowband can include industry standard protocols such as G3-PLC (ITU G.9903), a custom protocol, or another relevant industry standard protocol.

In an example, the first PLC transceiver 214 can include a wiring schematic coupled to the PLC receiver 234. The first PLC transceiver 214 can include a first connection and a second connection. For example, the first connection can be coupled to the terminal 238*a* and the second connection can be coupled to the terminal 238*b*. The terminal 238*b* can alter a polarity of a source corresponding with time. For example, for a first duration the alternating source can transmit a positive current or voltage and for a second duration the alternating source can transmit a negative current or voltage. In another example, the first PLC transceiver 214 and the first processor 204 can be included on a single printed circuit board as modules or independent devices.

The first DIP switches 216, in an embodiment, can include a manual electric switch that is packaged with others in a group in a standard dual in-line package. In an example, the first DIP switches 216 can refer to each individual switch, or to the unit as a whole. In another example, the first DIP switches 216 can be used on a printed circuit board along with other electronic components and can be used to customize the behavior of an electronic device for specific situations.

The first DIP switches 216, in an embodiment, can include a manual electric switch that is packaged with others in a group in a standard dual in-line package. In an example, the first DIP switches 216 can be used on a printed circuit board along with other electronic components and can be used to customize the behavior of an electronic device for specific situations. In an example, the first DIP switches 216 can represent an identifier of the first LED strip 206 and the second LED strip 210. In an example, the first DIP switches 216 can correspond to various positions. For example, the switch positions can correspond to a unique ID corresponding to the first lamp component 202. As illustrated in FIG. 2, the position of switches is represented based on a position of the white box for each of the DIP switches 216, either up or down. In another example, the first switch of the first DIP switches 216 can correspond to a physical position of the first lamp component 202. For example, the first lamp component 202 can be on a right side or a left side relative to a reference point. In an example, the first lamp component 202 on the left side of the reference point can include the first switch to be in an up position ("1") indicating a left lamp. The remaining switches can be used for a unique ID and a time delay value, which can be used for timing of communication. In an example, the first DIP switches 216 can include at least seven DIP switches.

The second lamp component 218, in an embodiment, can include a reflective covering to illuminate a surrounding environment. For example, the second lamp component 218 can include a reflective material sufficient for oncoming travelers to identify the system 200.

The second processor 220, in an embodiment, can include any device to perform logic processing. For example, the second processor 220 can include a microprocessor programmable to include software programs to interface and control various components of the system 200. In an example, the microprocessor can include a RASPBERRY PI, ARDUINO, or another type of microprocessor. In another example, the second processor 220 can be coupled to the third LED strip 222, the fourth LED strip 226, the Second PLC transceiver 230, and the plurality of second DIP switches 232. In an example, the components of the system 200 can be independent of another. For example, the second processor 220 can be housed within a ruggedized housing unit independent of the third LED strip 222 and the fourth LED strip 226.

In another example, the second processor 220 can receive statuses of the third LED strip 222 and the fourth LED strip 226. For example, the statuses can indicate whether the third LED strip 222 and the fourth LED strip 226 are operating normally. In an example, the statuses can indicate whether the third LED strip 222 or the fourth LED strip 226 are inoperable. In an example, the statuses can indicate whether the third LED strip 222 and the fourth LED strip 226 are inoperable. The second processor 220 can generate a communication payload based on the statuses of the third LED strip 222 and the fourth LED strip 226. For example, the second processor 220 can include a state machine to convert the statuses to binary representation. In an example, the binary representation can be as follows:

| State | Binary | Meaning |
|---|---|---|
| 0 | 00 | Both LED strips are inoperable |
| 1 | 01 | The first LED string 106 is inoperable, the second LED string 110 is operable |
| 2 | 10 | The first LED string 106 is operable, the second LED string 110 is inoperable |
| 3 | 11 | The first LED string 106 is operable, the second LED string 110 is operable |

In another example, the second processor 220 can generate a communication payload corresponding to the statuses. For example, the second processor 220 can perform various protocol actions across a time window. The protocol actions can include wakeup, delay, transmission, and silence. The wakeup action can include the system 200 receives power, performs self-diagnostic checks, and prepares the system 200 for transmitting over the power line. The delay can include activation of a communication timing delay based on a position of the second DIP switches 232 and standby to transmit a message. The transmission can include an end to the delay and the system 200 transmits the ID and the statuses. The silence can include a standby to lose power when the time window ends. The time window can include a 1 second duration.

The third LED strip 222, in an embodiment, can include a housing for the third plurality of LEDs 224*a*-224*f* For example, the third LED strip 222 can include independent structures for each of the third plurality of LEDs 224*a*-224*f* In an example, the third LED strip 222 can include electrical hardware (not shown) to power the third LED strip 222. For example, the third LED strip 222 can receive between 9 and 16 volts (V) either alternating current (AC) or direct current (DC). In another example, the LED strip 106 can include non-polarity sensitive hardware. In another example, the third LED strip 222 can transmit statuses corresponding to the third plurality of LEDs 224*a*-224*f* to the second processor 220. For example, the statuses can include the third LED strip 222 is either operable or inoperable. The third LED strip 222 can indicate the third plurality of LEDs 224*a*-224*f* are operable when at least one of the third plurality of LEDs 224*a*-224*f* are operating normally. The third LED strip 222 can indicate the third plurality of LEDs 224*a*-224*f* are inoperable when none of the third plurality of LEDs 224*a*-224*f* are operating normally.

The third plurality of LEDs 224*a*-224*f*, in an embodiment, can include LEDs of various colors and manufacturing capabilities. For example, the third plurality of LEDs 224*a*-224*f* can include at least one LED. In an example, the third plurality of LEDs 224*a*-224*f* can each be coupled in series. In another example, the third plurality of LEDs 224*a*-224*f* can each be coupled in parallel.

The fourth LED strip 226, in an embodiment, can include a housing for the fourth plurality of LEDs 228*a*-228*f* For example, the fourth LED strip 226 can include independent structures for each of the fourth plurality of LEDs 228*a*-228*f*. In an example, the fourth LED strip 226 can include electrical hardware (not shown) to power the fourth LED strip 226.

The fourth plurality of LEDs 228*a*-228*f*, in an embodiment, can include LEDs of various colors and manufacturing capabilities. For example, the fourth plurality of LEDs 228*a*-228*f* can include at least one LED. In an example, the fourth plurality of LEDs 228*a*-228*f* can each be coupled in series. In another example, the fourth plurality of LEDs 228*a*-228*f* can each be coupled in parallel.

The second PLC transceiver 230, in an embodiment, can transmit data on a conductive wire that is also used for power transmission. For example, the second PLC transceiver 230 can transmit statuses of the third LED strip 222 and the fourth LED strip 226 and positions of the second DIP switches 232 via power-line communications utilizing voltage feed lines powering the smart lamp. The voltage feed lines can include AC power transmission. In an example, the voltage feed lines can include DC power transmission and the second PLC transceiver 230 can include a converter hardware to convert the DC power for data communications (i.e., modulate the DC power corresponding to bits of the data communications). In another example, the second PLC transceiver 230 can operate by adding a modulated carrier signal to the power line. For example, the power line transmitting power to the system 200 can include the modulated carrier signal at a particular frequency. The particular frequency can include a narrowband, a low speed narrowband, and a medium speed narrowband. In an example, the narrowband can include a data rate of 20 bits per second (bit/s). For example, the narrowband can include industry standard protocols such as X10, Consumer Electronics Bus (CEBus), Local Operating Networks (LonWorks), a custom protocol, or another relevant industry standard protocol. The low speed narrowband can include a data rate of 200 to 1200 bit/s. For example, the low speed narrowband can include industry standard protocols such as IEC 61334, Open Smart Grid Protocol (OSGP), ETSI 103 908, a custom protocol, or another relevant industry standard protocol. The medium speed narrowband can include a data rate of up to 576 kilobits per second (kbit/s). For example, the medium speed narrowband can include industry standard protocols such as G3-PLC (ITU G.9903), a custom protocol, or another relevant industry standard protocol.

In an example, the second PLC transceiver 230 can include a wiring schematic coupled to the PLC receiver 234. The second PLC transceiver 230 can include a third connection and a fourth connection. For example, the third connection can be coupled to the terminal 238*b* and the fourth connection can be coupled to the terminal 238*c*. The terminal 238*b* can alter a polarity of a source corresponding with time. For example, for a first duration the alternating source can transmit a positive current or voltage and for a second duration the alternating source can transmit a negative current or voltage. In another example, the second PLC transceiver 230 and the second processor 220 can be included on a single printed circuit board as modules or independent devices.

The second DIP switches 232, in an embodiment, can include a manual electric switch that is packaged with others in a group in a standard dual in-line package. In an example, the second DIP switches 232 can be used on a printed circuit board along with other electronic components and can be used to customize the behavior of an electronic device for specific situations. In an example, the second DIP switches 232 can represent an identifier of the third LED strip 222 and the fourth LED strip 226. In an example, the second DIP switches 232 can correspond to various positions. For example, the switch positions can correspond to a unique ID corresponding to the second lamp component 218. As illustrated in FIG. 2, the position of the second DIP switches 232 is represented based on a position of the white box for each of the switches, either up or down. In an example, the first switch of the second DIP switches 232 can correspond to a physical position of the second lamp component 218. For example, the second lamp component 218 can be on a right side or a left side relative to a reference point. In an example, the second lamp component 218 on the right side of the reference point can include the first switch to be in a down position ("0") indicating a right lamp. The remaining switches can be used for a unique ID and a time delay value, which can be used for timing of communication. In an example, the second DIP switches 232 can include at least seven DIP switches.

The signal bungalow 234, in an embodiment, can provide a housing for the surge panel 236, terminals 238*a*-238*c*, the PLC receiver 240, and the mast inputs 242*a*-242*b*. For example, the housing can include a ruggedized material to protect the internal components from any environmental characteristics and hazards. In an example, the signal bungalow 234 can correspond to a crossing control house for a railway crossing application.

The surge panel 236, in an embodiment, can protect against power surges. For example, the power surges can include electrical signals greater than a predetermined voltage or current threshold. The surge panel 236 can ensure protection of any subsequent components from being short circuited from spikes in electrical activity. For example, the surge panel 236 can reduce the power surge to a manageable power level corresponding to an appropriate power distribution level for the subsequent electrical components. In an example, the surge panel 236 can include the terminals 238*a*-238*c*.

The terminals 238*a*-238*c*, in an embodiment, can include a connector coupling electrical hardware. For example, the terminals 238*a*-238*c* can couple the first PLC transceiver 214 and the second PLC transceiver 230 to the PLC receiver 240. The terminals 238*a*-238*c* can include a variety of types including a wire connector, butt connectors, push on terminals, ring terminals, spade terminals, hook terminals, bullet connector, pin terminals, sealed connector, a fastener, or another type of terminal relevant for the application. The terminals 238*a*-238*c* can transfer current from a power or grounding source for the application. In an example, the terminals 238*a*-238*c* can include wire terminals, creating a secure electrical connection. In another example, the terminals 238*a*-238*c* can be insulated or non-insulating.

The PLC receiver 240, in an embodiment, can receive data on a conductive wire that is also used for power transmission. For example, the power transmission can include AC power. In an example, the power transmission can include DC and the PLC receiver 240 can include a power converter to convert the DC power to AC for data communications. In another example, the PLC receiver 240 can operate by adding a modulated carrier signal to the power line. For example, the power line between the components of the system 200 can include the modulated carrier signal at a particular frequency. The particular frequency can include a narrowband, a low speed narrowband, and a medium speed narrowband. In an example, the narrowband can include a data rate of 20 bits per second (bit/s). For example, the narrowband can include industry standard protocols such as X10, Consumer Electronics Bus (CEBus), Local Operating Networks (LonWorks), a custom protocol, or another relevant industry standard protocol. The low speed narrowband can include a data rate of 200 to 1200 bit/s. For example, the low speed narrowband can include industry standard protocols such as IEC 61334, Open Smart Grid Protocol (OSGP), ETSI 103 908, a custom protocol, or another relevant industry standard protocol. The medium speed narrowband can include a data rate of up to 576 kilobits per second (kbit/s). For example, the medium speed narrowband can include industry standard protocols such as G3-PLC (ITU G.9903), a custom protocol, or another relevant industry standard protocol.

In another example, the PLC receiver 240, can receive position information from the first PLC transceiver 214 and the second PLC transceiver 230, ID information corresponding to the first DIP switches 216 and the second DIP switches 232, and statuses of the first LED strip 206, the second LED strip 210, the third LED strip 222, and the fourth LED strip 226. The position information can correspond to a relative position of each of the first lamp component 202 and the second lamp component 218. For example, when the first lamp component 202 is to the left of the second lamp component 218, the position information represents the positions of each respective component. In an example, the PLC receiver 240 can receive electrical signals from the terminals 238*a*-238*c*. For example, the terminals 238*a*-238*c* can provide power to the first PLC transceiver 214 and the second PLC transceiver 230. In an example, the terminals 238*a*-238*c* can correspond to an LXE circuit, LNE circuit, and LE circuit to provide power. The LXE can be a dedicated positive. The LNE can be a dedicated negative. The LE can be a polarity swapping conductor used to provide positive energy to one component, and act as a negative to another component. In this way, the LE circuit changes polarity, the PLC receiver 240 can include terminal connection points that are not polarity sensitive.

In another example, the PLC receiver 240 can correspond to a web-based graphical user interface (web GUI) allowing a technician to configure and customize the system 200 to match the application. For example, the system 200 is exemplary and can extrapolate to any number of PLC transceivers and LED strips. In an example, the web GUI can include both configurable labels (i.e. left/right) and fixed objects that are non-configurable, that can be selected (i.e. front/rear). In an example, if an object is selected, a label should be attached. In an example, the PLC receiver 240 can include the mast inputs 242*a*-242*b*. The mast inputs 242*a*-242*b*, in an embodiment, can interface the terminals 238*a*-238*c* to the PLC receiver 240.

Figure 3:
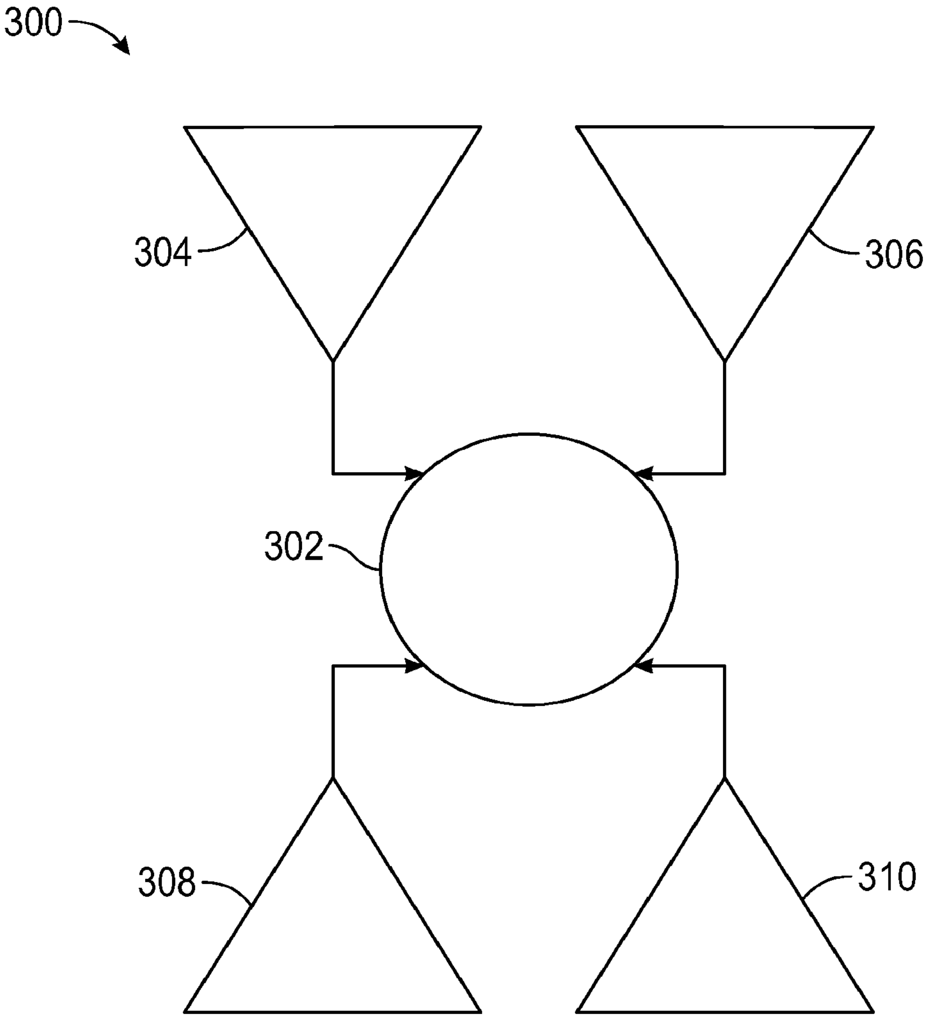
FIG. 3 illustrates a smart lamp architecture, in accordance with one or more exemplary embodiments of the present disclosure.

FIG. 3 illustrates a smart lamp architecture 300, in accordance with one or more exemplary embodiments of the present disclosure. The architecture 300 can include a mast 302, a first front-facing lamp 304, a second front-facing lamp 306, a first rear-facing lamp 308, and a second rear-facing lamp 310.

The mast 302, in an embodiment, can provide a structure for the first front-facing lamp 304, the second front-facing lamp 306, the first rear-facing lamp 308, and the second rear-facing lamp 310. The mast 302 can provide a housing for the electrical connections between the first front-facing lamp 304, the second front-facing lamp 306, the first rear-facing lamp 308, and the second rear-facing lamp 310 and a signal bungalow (e.g., signal bungalow 234 in FIG. 2).

The first front-facing lamp 304, in an embodiment, can include a smart lamp (e.g., the system 100 in FIG. 1). In an example, the first front-facing lamp 304 and the second front-facing lamp 306 can form a system of smart lamps (e.g., system 200 in FIG. 2). For example, the first front-facing lamp 304 can couple to a PLC receiver (e.g., the PLC receiver 240 of FIG. 2).

The second front-facing lamp 306, in an embodiment, can include a smart lamp (e.g., the system 100 in FIG. 1). In an example, the first front-facing lamp 304 and the second front-facing lamp 306 can form a system of smart lamps (e.g., system 200 in FIG. 2). For example, the first front-facing lamp 304 can couple to a PLC receiver (e.g., the PLC receiver 240 of FIG. 2).

The first rear-facing lamp 308, in an embodiment, can include a smart lamp (e.g., the system 100 in FIG. 1). In an example, the first front-facing lamp 304 and the second front-facing lamp 306 can form a system of smart lamps (e.g., system 200 in FIG. 2). For example, the first front-facing lamp 304 can couple to a PLC receiver (e.g., the PLC receiver 240 of FIG. 2).

The second rear-facing lamp 310, in an embodiment, can include a smart lamp (e.g., the system 100 in FIG. 1). In an example, the first front-facing lamp 304 and the second front-facing lamp 306 can form a system of smart lamps (e.g., system 200 in FIG. 2). For example, the first front-facing lamp 304 can couple to a PLC receiver (e.g., the PLC receiver 240 of FIG. 2).

In another example, the system 300 can correspond to a web GUI through the PLC receiver allowing a technician to configure and customize the system 300 to match the application. For example, the system 300 is exemplary and can extrapolate to any number of PLC transceivers and LED strips. In an example, the web GUI can include both configurable labels (i.e. left/right) and fixed objects that are non-configurable, that can be selected (i.e. front/rear). In an example, if an object is selected, a label should be attached. In an example, configurations can be established by a user. An object can correspond to identify which label are assigned to which crossing mast. In an example, the object can include a path organizing a placement of lamps. In another example, the label can include the IDs corresponding to each of the lamps. For example, when a mast includes four lamps (two front, two rear) and one of the lamps is inoperable (transmitting a "0" state). If the same mast is transmitting two "0" states for the front pair of flashers, the PLC receiver can generate an alarm or an alert indicating an activation failure is in effect. The alarm or alert can correspond to the level of response needed from a technician. The alarm and alert conditions can include the following information.

If a master crossing relay is in a down position, the following conditions generate an alert:
  1) If <50% of lamps are functioning for a front path
  2) If pairs of lamps are >1 and total functioning pairs of lamps is <50%

If a master crossing relay is in a down position, the following conditions generate an alarm:
  1) If a status report from the lamps of any state is "00" and >50% of pairs of lamps are operational
  2) If a status report from the lamps of any state is "01"
  3) If a status report from the lamps of any state is "10"
  4) If a status report from the lamps of any state is not reporting
  5) If conflicting messages received from any of the lamps
  6) If no message or status received for >5 seconds The master crossing relay can include a structure blocking an accessibility to a railway crossing. In an example, the status report from the lamps can correspond to a status of the operability of the lamps, in no way is the example above meant to limit the breadth of the statuses used for a particular application. Rather, the example above is meant to be explanatory in nature. In another example, the alert can correspond to the activation failure, indicating more than 50% of the lamps are inoperable. In an example, the alarm can correspond to a general alarm indicating greater than 50% but less than 100% of the lamps are operational.

In an example, the smart lamp components can communicate across a message transmission window. The message transmission window can correspond to the DIP switches and configured within a web GUI. All the DIP switches can be configured as a binary 7-digit ID to ensure that the PLC receiver understands when to receive a message from each of the smart lamps. For example, in the situation when two lamps have been assigned to a first label path of a front pair, the web GUI can generate a front left label and a front right label. In an example, the first front-facing lamp 302 can have an ID of "1111110," where the first digit denoting left side, remaining digits denoting delay. In another example, the second front-facing lamp 304 can have an ID of "0111110," where the first digit denoting right, remaining digits denoting delay. When the 7-digit ID can be configured within the web GUI, the PLC receiver can understand two lamps can be transmitting statuses at certain time slots. In an example, the lamps can transmit a message every 1-second cycle.

Figure 4:
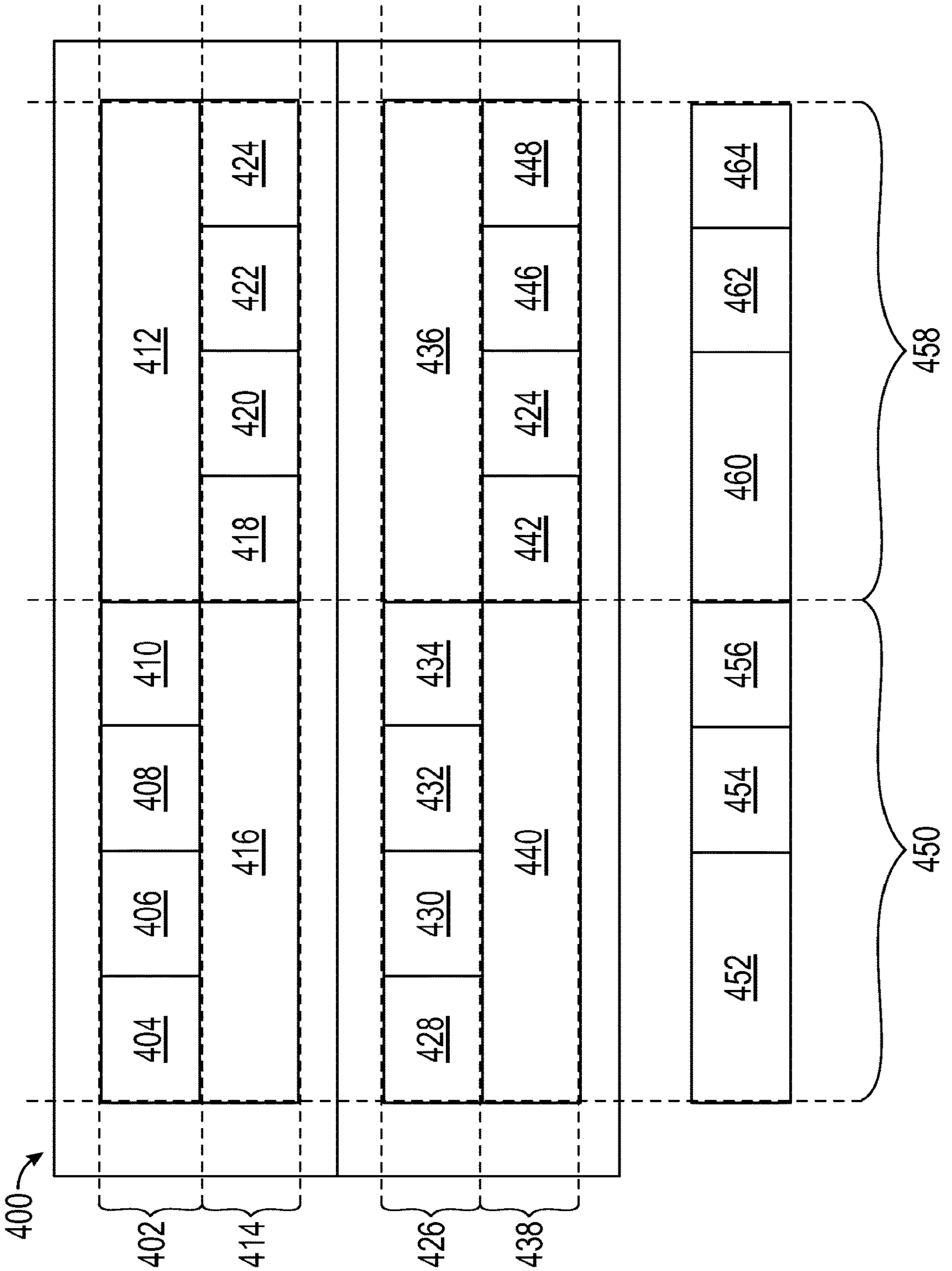
FIG. 4 illustrates a schematic view of a smart lamp protocol, in accordance with one or more exemplary embodiments of the present disclosure.

FIG. 4 illustrates a schematic view of a smart lamp protocol 400, in accordance with one or more exemplary embodiments of the present disclosure. The protocol 400 can include a front left payload 402, a front left wakeup message 404, a front left delay message 406, a front left data transmit message 408, a front left silence period 410, a front left disengaged message 412, a front right payload 414, a front right disengaged message 416, a front right wakeup message 418, a front right delay message 420, a front right data transmit message 422, a front right silence period 424, a rear left payload 426, a rear left wakeup message 428, a rear left delay message 430, a rear left data transmit message 432, a rear left silence period 434, a rear left disengaged message 436, a rear right payload 438, a rear right disengaged message 440, a rear right wakeup message 442, a rear right delay message 444, a rear right data transmit message 446, a rear right silence period 448, a first PLC payload 450, an enable message 452, a front left message 454, a rear left message 456, a second PLC payload 458, a final message 460, a front right message 462, and a rear right message 464.

In an example, the smart lamp protocol 400 can be used for communications between a smart lamp system and a PLC receiver (e.g., the system 200 in FIG. 2). In this way, the smart lamp components can generate a tremendous number of messages to the PLC receiver. In an example, the smart lamp components can communicate across a message transmission window. The message transmission window can correspond to the DIP switches and configured within a web GUI. All the DIP switches can be configured as a binary 7-digit ID to ensure that the PLC receiver understands when to receive a message from each of the smart lamps. For example, in the situation when two lamps have been assigned to a first label path of a front pair, the web GUI can generate a front left label and a front right label. In an example, the front left lamp has an ID of "1111110," where the first digit denoting left side, remaining digits denoting delay. In another example, the front right lamp has an ID of "0111110," where the first digit denoting right, remaining digits denoting delay. When the 7-digit ID can be configured within the web GUI, the PLC receiver can understand two lamps can be transmitting statuses at certain time slots. In an example, the lamps can transmit a message every 1-second cycle.

In another example, the lamps can perform a variety of actions for the window of activation. For example, each of the lamps can perform four actions during a corresponding 1-second window of activation. The protocol actions can include wakeup, delay, transmission, and silence. The wakeup action can include the system receives power, performs self-diagnostic checks, and prepares the system for transmitting over the power line. The delay can include activation of a communication timing delay based on a position of the DIP switches and standby to transmit a message. The transmission can include an end to the delay and the system transmits the ID and the statuses. The silence can include a standby to lose power when the time window ends. The time window can include a 1 second duration.

In another example, the PLC receiver can have a similar set of actions for each of the messages received from the lamps. In an example, the PLC receiver can always have power and can trigger receiving messages in response to an input from the main crossing relay. In an example, the PLC receiver can perform a variety of actions when triggered. For example, the actions can include a crossing relay down action, a message receipt action, a message transmission action, and a crossing relay up action. The crossing relay down action can trigger the PLC receiver to begin receiving messages from the lamps. The message receipt action can indication when the PLC receiver is to receive a message from the lamps. The message transmission action can trigger the PLC receiver to transmit lamp IDs and statuses. The crossing relay up can trigger the PLC receiver to stop performing any actions and to standby for further instructions.

The front left payload 402, the front right payload 414, the rear left payload 426, and the rear right payload 438, in an embodiment, can include lamp information corresponding to a respective system. For example, the front left payload 402, front left wakeup message 404, front left delay message 406, front left data transmit message 408, front left silence period 410, front left disengaged message 412 can correspond to a front left lamp. In another example, the front right payload 414, front right disengaged message 416, front right wakeup message 418, front right delay message 420, front right data transmit message 422, front right silence period 424 can correspond to a front right lamp. For example, the rear left payload 426, rear left wakeup message 428, rear left delay message 430, rear left data transmit message 432, rear left silence period 434, rear left disengaged message 436 can correspond to a rear left lamp. In an example, the rear right payload 438, rear right disengaged message 440, rear right wakeup message 442, rear right delay message 444, rear right data transmit message 446, rear right silence period 448 can correspond to a rear right lamp. The lamp information can include the statuses of the LEDs and DIP switch arrangement.

The front left wakeup message 404, the front right wakeup message 418, the rear left wakeup message 428, and the rear right wakeup message 442, in an embodiment, can include a message to a PLC receiver to standby while the system receives power, performs self-diagnostic checks, and prepares the system for transmitting over the power line. The front left delay message 406, the front right delay message 420, the rear left delay message 430, and the rear right delay message 444, in an embodiment, can include a message indicating to the PLC receiver to standby based on a position of the DIP switches prior to transmitting a message. The front left data transmit message 408, front right data transmit message 422, the rear left data transmit message 432, and the rear right data transmit message 446, in an embodiment, can include a message to the PLC receiver to end the delay and the system transmits the ID and the statuses of the LEDs and DIP switches. The front left silence period 410, the front right silence period 424, the rear left silence period 434, and the rear right silence period 448, in an embodiment, can include a message to the PLC receiver notifying of the system will lose power when the time window ends. The time window can include a 1 second duration. The front left disengaged message 412, the front right disengaged message 416, the rear left disengaged message 436, and the rear right disengaged message 440, in an embodiment, can correspond to no transmission from the system during this period.

The first PLC payload 450 and the second PLC payload 458, in an embodiment, can include lamp information corresponding to a position of the lamp. For example, the first PLC payload 450 can include information corresponding to the front left lamp and the rear left lamp. In another example, the first PLC payload 450 can include an instruction from a crossing relay to activate all the corresponding lamps. The second PLC payload 458 can include information corresponding to the front right lamp and the rear left lamp. In another example, the second PLC payload 458 can include transmission of the final message 460.

The enable message 452, in an embodiment, can include the instruction from the crossing relay to activate all the corresponding lamps. For example, the crossing relay can activate in response to a vehicle completing a circuit and the crossing relay can transmit the enable message 452 to the PLC receiver to activate the corresponding lamps. The front left message 454 and the rear left message 456, in an embodiment, can include information corresponding to the front left data transmit message 408 and the rear left data transmit message 432, respectively. The final message 460, in an embodiment, can include the lamp information indicating the LED statuses and the DIP switch positions. For example, the PLC receiver can transmit the final message 460 across a network. The front right message 462 and the rear right message 464, in an embodiment, can include information corresponding to the front right data transmit message 422 and the rear right data transmit message 446, respectively.

Figure 5:
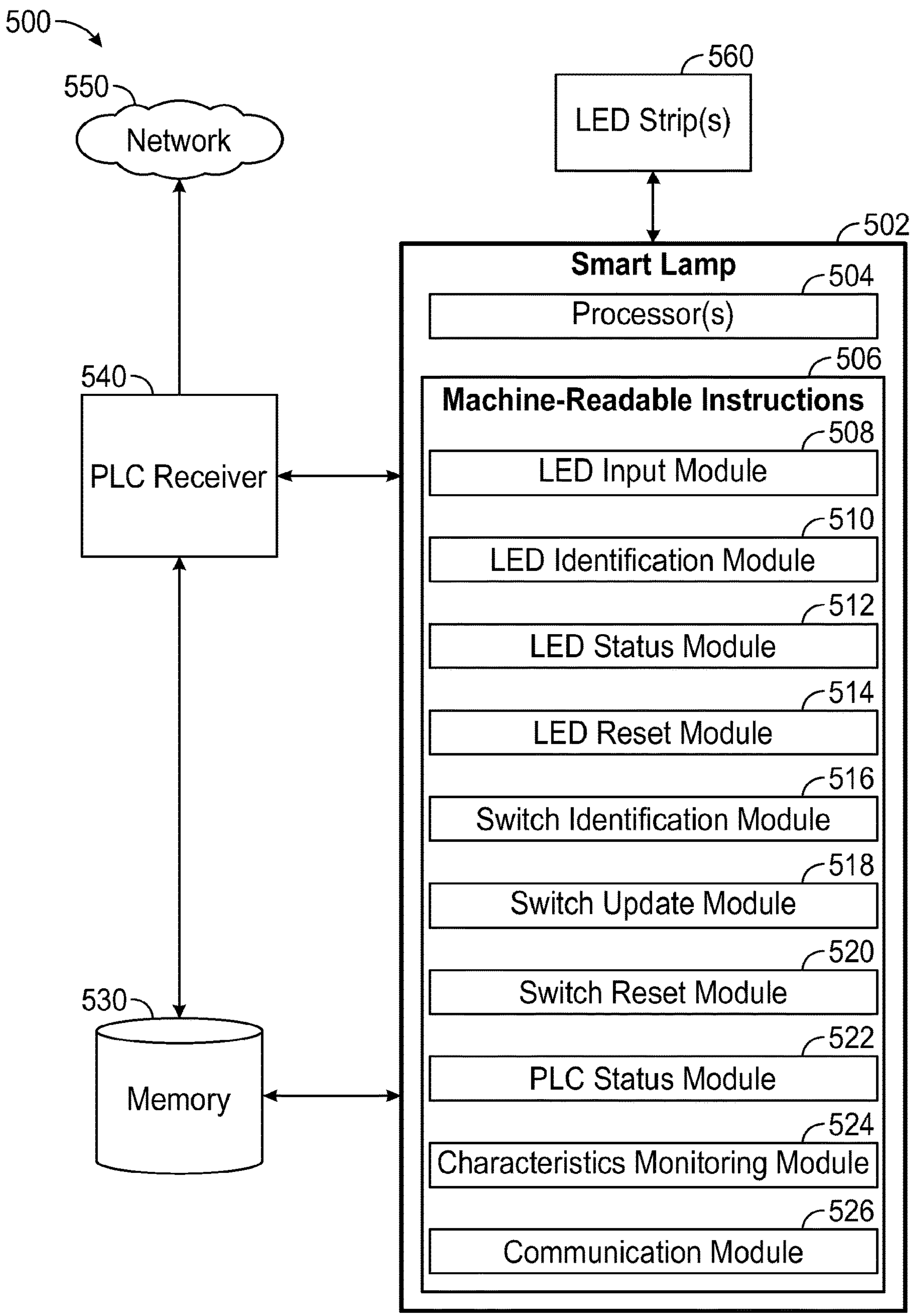
FIG. 5 illustrates a block diagram of a smart lamp system, in accordance with one or more exemplary embodiments of the present disclosure.

FIG. 5 illustrates a schematic view of a smart lamp system 500, in accordance with one or more exemplary embodiments of the present disclosure. The system 500 can include a smart lamp 502 having one or more processor(s) 504, a memory 530, machine-readable instructions 506, including an LED input module 508, LED identification module 510, LED status module 512, LED reset module 514, switch identification module 516, switch update module 518, switch reset module 520, PLC status module 522, characteristics monitoring module 524, communication module 526, among other relevant modules. The smart lamp 502 can be operably coupled to a PLC device 540 and at least one LED strip 560. The PLC device 540 can include network architecture components such as a server, modem, router, or another type of hardware or software for communicating data over the network 550. In another example, the PLC device 540 can include an application configured to communicate with the smart lamp 502 over wired or wireless communication methods. The LED strip 560 can include a housing for a plurality of LEDs.

The aforementioned system components (e.g., smart lamp 502 and PLC device 540) can be communicably coupled to other smart lamp systems via the network 550, such that data can be transmitted. The network 550 can be the Internet, intranet, a Modbus communication network, or other suitable network. The data transmission can be encrypted, unencrypted, over a VPN tunnel, or other suitable communication means. The network 550 can be a WAN, LAN, PAN, or other suitable network type. The network communication between the PLC device 540, smart lamp 502, or any other system component can be encrypted using PGP, Blowfish, Twofish, AES, 3DES, HTTPS, or other suitable encryption. The system 500 can be configured to provide communication via the various systems, components, and modules disclosed herein via a web GUI, an application programming interface (API), Modbus, PCI, PCI-Express, ANSI-X12, Ethernet, Wi-Fi, Bluetooth, or other suitable communication protocol or medium. Additionally, third party systems and databases can be operably coupled to the system components via the network 550.

The data transmitted to and from the components of system 500 (e.g., the smart lamp 502 and PLC device 540), can include any format, including JavaScript Object Notation (JSON), TCP/IP, XML, HTML, ASCII, SMS, CSV, representational state transfer (REST), remote terminal unit (RTU), or other suitable format. The data transmission can include a variation of the foregoing formats particular for use with the Modbus protocol. The data transmission can include a message, flag, header, header properties, metadata, and/or a body, or be encapsulated and packetized by any suitable format having same.

The smart lamp 502 can be implemented in hardware, software, or a suitable combination of hardware and software therefor, and may include one or more software systems operating on one or more smart lamp 502, having one or more processor(s) 504, with access to memory 530. The smart lamp 502 can include electronic storage, one or more processors, and/or other components. The smart lamp 502 can include communication lines, power lines, connections, and/or ports to enable the exchange of information via a network (e.g., the network 550) and/or other computing platforms. The smart lamp 502 can also include a plurality of hardware, software, and/or firmware components operating together to provide the functionality attributed herein to the smart lamp 502. For example, the smart lamp 502 can be implemented in a virtual environment by a cloud of computing platforms operating together as the smart lamp 502, including Software-as-a-Service (SaaS), Infrastructure-as-a-Service (IaaS), and Platform-as-a-Service (PaaS) functionality. Additionally, the smart lamp 502 can include memory 530.

Memory 530 can include electronic storage that can include non-transitory storage media that electronically stores information. The electronic storage media of electronic storage can include one or both of system storage that can be provided integrally (e.g., substantially non-removable) with the smart lamp 502 and/or removable storage that can be removably connectable to the smart lamp 502 via, for example, a port (e.g., a USB port, a firewire port, etc.) or a drive (e.g., a disk drive, etc.). Electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage may include one or more virtual storage resources (e.g., cloud storage, a virtual private network, and/or other virtual storage resources). The electronic storage can include a database, or public or private distributed ledger (e.g., blockchain). Electronic storage can store machine-readable instructions 506, software algorithms, control logic, data generated by processor(s), data received from server(s), data received from computing platform(s), and/or other data that can enable server(s) to function as described herein. The electronic storage can also include third-party databases accessible via the network 550.

Processor(s) 504 can be configured to provide data processing capabilities in the smart lamp 502. As such, processor(s) 504 can include one or more of a digital processor, an analog processor, a digital circuit designed to process information, an analog circuit designed to process information, a state machine, and/or other mechanisms for electronically processing information, such as FPGAs or ASICs. The processor(s) 504 can be a single entity or include a plurality of processing units. These processing units can be physically located within the same device, or processor(s) 504 can represent processing functionality of a plurality of devices or software functionality operating alone, or in concert.

The processor(s) 504 can be configured to execute machine-readable instructions 506 or machine learning modules via software, hardware, firmware, some combination of software, hardware, and/or firmware, and/or other mechanisms for configuring processing capabilities on processor(s) 504. As used herein, the term "machine-readable instructions" can refer to any component or set of components that perform the functionality attributed to the machine-readable instructions component 506. This can include one or more physical processor(s) 504 during execution of processor-readable instructions, the processor-readable instructions, circuitry, hardware, storage media, or any other components.

The smart lamp 502 can be configured with machine-readable instructions 506 having one or more functional modules and a computer-implemented method for operating the smart lamp. The machine-readable instructions 506 can be implemented on one or more smart lamp 502, having one or more processor(s) 504, with access to memory 530. The machine-readable instructions 506 can be a single networked node, or a machine cluster, which can include a distributed architecture of a plurality of networked nodes. The machine-readable instructions 506 can include control logic for implementing various functionality, as described in more detail below. The machine-readable instructions 506 can include certain functionality associated with the system 500. Additionally, the machine-readable instructions 506 can include a smart contract or multi-signature contract that can process, read, and write data to the database, distributed ledger, or blockchain.

Figure 6:
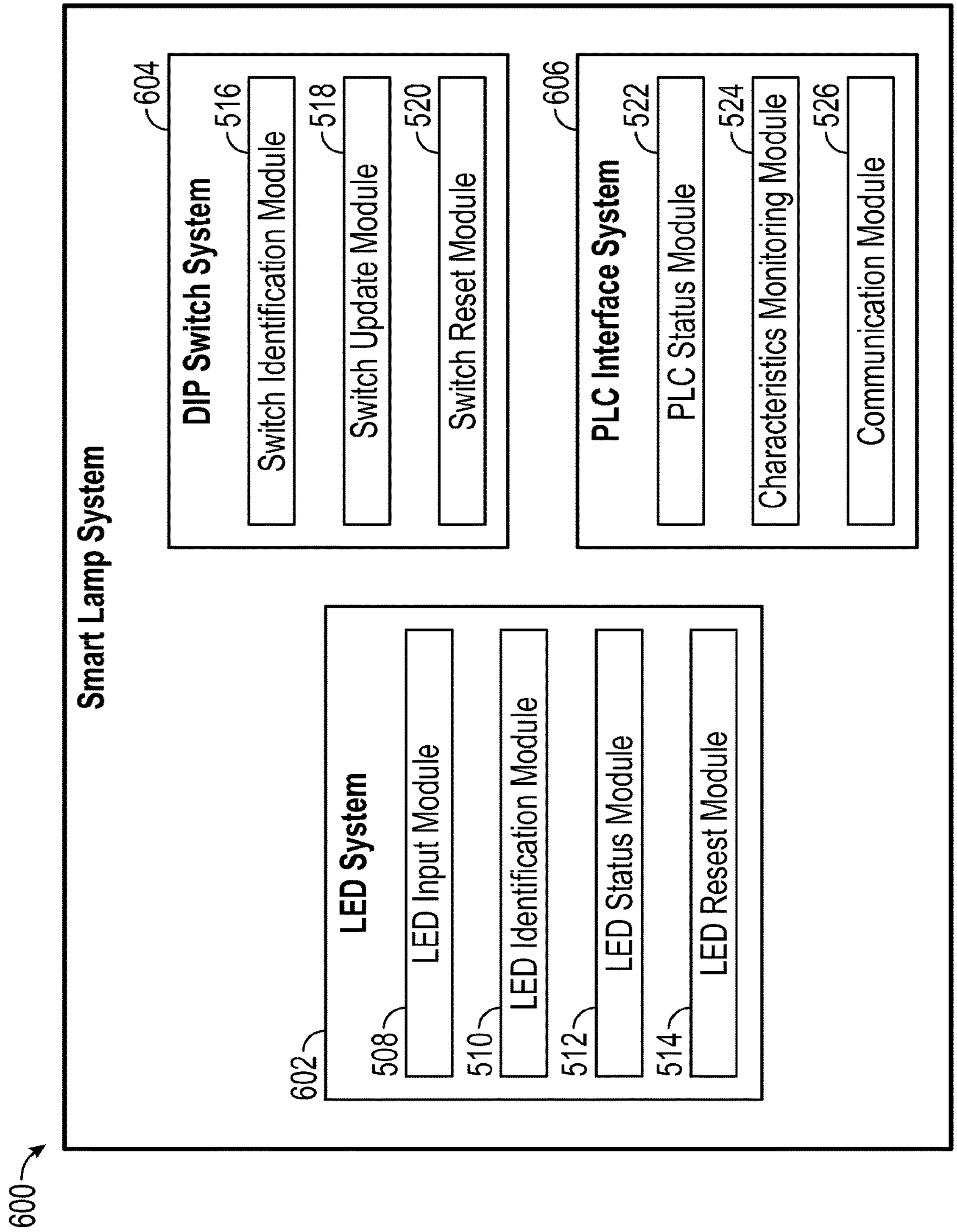
FIG. 6 illustrates a schematic view of a smart lamp system, in accordance with one or more exemplary embodiments of the present disclosure.

FIG. 6 illustrates a schematic view of a smart lamp system 600, in accordance with one or more exemplary embodiments of the present disclosure. The system 600 can include an LED system 602, DIP switch system 604, and PLC interface system 606. Although certain exemplary embodiments may be directed to a particular hardware architecture, the system 600 can be extrapolated to be used for controlling a plurality of smart lamps in various configurations. In one embodiment, the LED system 602 can include the LED input module 508, LED identification module 510, and LED status module 512. The LED input module 508, LED identification module 510, and LED status module 512 can implement one or more algorithms to identify and monitor statuses of LEDs. The algorithms can be programmable to suit a configuration of LEDs for particular applications, such as monitoring the statuses of the LEDs for a railway crossing.

The LED input module 508, in an embodiment, can interface a processor with a strip of LEDs. For example, the processor 504 and the strip of LEDs 560 from FIG. 5. In an example, the LED input module 508 can receive electrical signals corresponding to the LED strips for a smart lamp. In an example, the LEDs can correspond to a collective electrical signal transmitted to the processor at a particular voltage. The particular voltage can correspond with a manufacturer of the LEDs. For example, a first manufacturer can provide LEDs with a threshold voltage lower than LEDs from a second manufacturer.

The LED identification module 510, in an embodiment, can identify a particular LED strip of the smart lamp. For example, the LED identification module 510 can identify the LED strip based on an LED ID corresponding to each of the LED strips. In an example, the LED identification module 510 can include LED information corresponding to the LEDs present in the smart lamp. The LED identification module 510 can compare input signals from the LEDs to the LED information to identify the LED strips.

The LED status module 512, in an embodiment, can identify a status of the LED strips. For example, the LED status module 512 can identify which of the LED strips is operational. For example, the LED status module 512 can receive inputs from each of the LED strips indicating an ID and a status of the LEDs. In an example, the LED status module 512 can identify whether the LED strip is in an inoperable state based on the inputs from the LED strips. Alternatively, the LED status module 512 can determine whether the LED strips are in an operable state. For example, the LED strips can transmit the inputs including a binary representation of the state of the LEDs. The LED status module 512 can receive the inputs and classify the LED strips based on the states of the LED strips. In an example, the LED status module 512 can identify which particular LEDs of the LED strips are inoperable.

The LED reset module 514, in an embodiment, can reset the LED strips. For example, the LED reset module 514 can restart the LED strips by transmitting a reset instruction to the LED strips. In an example, the LED reset module 514 can transmit a communication payload including a sequence of binary symbols indicating to the LED strips to reset a status. The LED reset module 514 can correspond with a physical button input from a technician. For example, if the LED strip is inoperable or transmitting an incorrect state to the LED system 602, the technician can physically press a button to reset the LED strip.

In one embodiment, the DIP switch system 604 can include the switch identification module 516, the switch update module 518, and the switch reset module 520. The LED reset module 514, the switch identification module 516, and the switch update module 518 can implement one or more algorithms to determine a state of a plurality of DIP switches in response to communicating information between the smart lamp system 600 and a PLC receiver. The algorithms and their associated thresholds and/or signatures can be programmable to uniquely suit a particular application for a plurality of smart lamps. The DIP switch system 604 can be configured to transmit and receive messages related to DIP switch positions, updates, and states from the PLC interface system 606.

The switch identification module 516, in an embodiment, can identify a current state of the DIP switches. For example, the DIP switches can correspond to various states relating to a position of the smart lamp system 600. In an example, the DIP switches can generate an electrical signal based on a mechanical position of the DIP switches, relating to the position of the smart lamp system 600. For example, when the smart lamp system 600 is positioned adjacent to another smart lamp system, the DIP switches can include a configuration representing the relative positions of the DIP switches. In an example, the DIP switches can indicate whether the smart lamp system 600 is to the left or to the right of a common reference position. The DIP switches can represent the position of the smart lamp system 600 by a position of one of the DIP switches. For example, when the smart lamp system 600 is on the left of the common reference position, one of the DIP switches can be in an up state, represented as a binary "1" in the corresponding electrical signal.

The switch update module 518, in an embodiment, can identify when an update to an arrangement of the DIP switches occurs. For example, the DIP switches can change based on an external input, such as a technician physically flipping the DIP switch. In this way, the switch update module 518 can identify when the change occurs to the DIP switches by comparing a prior state of the DIP switches with a current state of the DIP switches. In an example, the prior state of the DIP switches can be included in local memory such that it can be stored indefinitely. For example, when the smart lamp system 600 resets, compatibility between the DIP switches and the prior state can be maintained. Alternatively, when the DIP switches change, the prior state can update to a new configuration and store the current state in local memory.

The switch reset module 520, in an embodiment, can reset any stored DIP switch arrangement. For example, when the DIP switches shift the mechanical positions causing the electrical signal to include inconsistent values, the switch reset module 520 can clear any stored DIP switch arrangement such that there is no ambiguity. The switch reset module 520 can correspond to a physical button to reset the values of the DIP switches. For example, the switch reset module 520 can correspond to a physical position of the DIP switches. In an example, the DIP switch reset module 520 can reset the stored DIP switch arrangement when all the DIP switches are in an up ("1") position, or alternatively, in a down ("0") position.

In one embodiment, the PLC interface system 606 can include the PLC status module 522, the characteristics monitoring module 524, and the communication module 526. The PLC status module 522, the characteristics monitoring module 524, and the communication module 526 can implement one or more algorithms to identify whether a PLC receiver is active, monitor characteristics of the smart lamp system 600 to identify whether to generate an alert and communicate with the PLC receiver. In an embodiment, the PLC interface system 606 can monitor when the LEDs are in an inoperable state and communicate the statuses of the LEDs and DIP switch positions to the PLC receiver to identify whether action is needed for the LEDs (i.e., to repair or replace any LEDs or the smart lamp).

The PLC status module 522, in an embodiment, can identify a status of a PLC receiver. For example, the PLC receiver can be disconnected from the smart lamp system 600, resulting in no power-line communications transmitted to the smart lamp system 600. In this way, the PLC status module 522 can identify the PLC receiver is inoperable. In another example, the PLC status module 522 can identify when the PLC receiver is capable of receiving a data transmission. For example, the PLC receiver can receive data transmission when the crossing relay is active. The PLC receiver can generate a notification to the PLC status module 522 to enable communications between the two components. The PLC status module 522 can receive the notification from the PLC receiver and begin the data communication process.

The characteristics monitoring module 524, in an embodiment, can monitor various characteristics of the smart lamp system 600. For example, the characteristics monitoring module 524 can monitor voltage, current, and DIP switch arrangement of the smart lamp system 600. In an example, the characteristics monitoring module 524 can identify a value of the voltage based on power-line transmission between the PLC interface system 606 and the PLC receiver. In an example, the characteristics monitoring module 524 can assign a smart lamp configuration based on the DIP switch arrangement. For example, the DIP switch arrangement can correspond with a physical position of the smart lamp system 600 in relation to other smart lamps. In an example, the DIP switch arrangement can include a DIP switch position indicating a position of the smart lamp relative to a reference point. For example, the DIP switch position can indicate the smart lamp is to the left of the reference point, or to the right of the reference point based on the DIP switch position being up or down, respectively. The characteristics monitoring module 524 can identify a value of the current based on power-line transmission between the PLC interface system 606 and the PLC receiver. The characteristics monitoring module 524 can identify positions of the DIP switches based on the electrical signal from the DIP switches. The electrical signal can include binary representation of the positions of the DIP switches.

In another example, the characteristics monitoring module 524 can detect an activation failure. For example, the characteristics monitoring module 524 can identify a number of operational LED strips. In an example, when the number of the operational LED strips is below a threshold the characteristics monitoring can generate an alert as the activation failure. The threshold can include a ratio of the operational LED strips to a total number of LED strips. In an example, the threshold can include the ratio to be 50% of the total number of LED strips are operational. The activation failure can correspond to legal compliance with regulations for public safety. For example, the activation failure can correspond to a number of operational LED strips at a railway crossing.

The communication module 526, in an embodiment, can transmit data between the PLC interface system 606 and the PLC receiver. For example, the communication module 526 can generate a communication payload organizing the DIP switch positions and the statuses of the LED strips in a binary format. The communication module 526 can transmit the data in a time duration corresponding to a particular application. For example, the communication module 526 can transmit the data in a 1-second time window. In an example, the communication module 526 can transmit lamp information. The lamp information can include the DIP switch positions and statuses of the LED strips.

Figure 7:
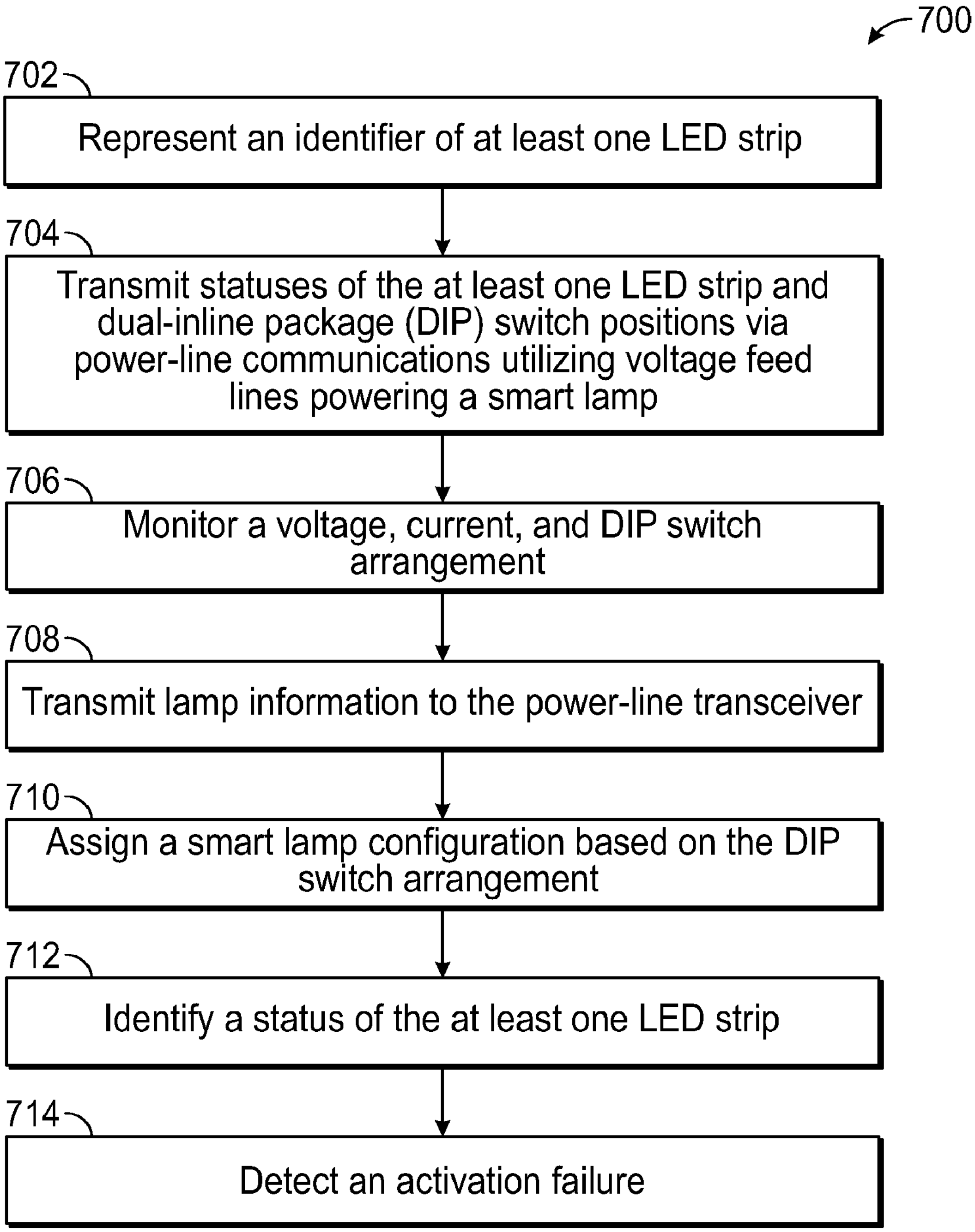
FIG. 7 illustrates a flowchart of smart lamp control logic, in accordance with one or more exemplary embodiments of the present disclosure.

FIG. 7 illustrates a flowchart exemplifying smart lamp control logic 700, in accordance with at least one embodiment of the present disclosure. The smart lamp control logic 700 can be implemented as an algorithm on a computer processor (e.g., vital logic controller, microprocessor, RASPBERRY PI, ARDUINO, field-programmable gate array (FPGA), application-specific integrated circuit (ASIC), server, etc.), a machine learning module, or other suitable system. Additionally, the smart lamp control logic 700 can be achieved with software, hardware, firmware, a web GUI, an API, a network connection, a network transfer protocol, a Modbus communication protocol, HTML, DHTML, JavaScript, Dojo, Ruby, Rails, other suitable applications, or a suitable combination thereof. The smart lamp control logic 700 can interface electrical components to control mechanical components using logic processors.

In an embodiment, the smart lamp control logic 700 can include a plurality of DIP switches for representing an identifier of at least one LED strip. The smart lamp control logic 700 can interface the DIP switches with a power-line transceiver configured to transmit statuses of the at least one LED strip and DIP switch positions via power-line communications utilizing voltage feed lines powering the smart lamp. The smart lamp control logic 700 can further include a memory for storing the DIP switch positions, the statuses, and configuration enabling information. Additionally, the smart lamp control logic 700 can interface the memory with a processor that is configured to configured to monitor the statuses of the at least one LED strip. The smart lamp control logic 700 implementing hardware components (e.g., computer processor) can be capable of executing machine-readable instructions to perform program steps and operably coupled to a memory for storing the DIP switch positions, the statuses, and configuration enabling information.

The smart lamp control logic 700 can leverage the ability of a computer platform to spawn multiple processes and threads by processing data simultaneously. The speed and efficiency of the smart lamp control logic 700 can be greatly improved by instantiating more than one process for monitoring a status of LEDs. However, one skilled in the art of programming will appreciate that use of a single processing thread may also be utilized and is within the scope of the present disclosure. The smart lamp control logic 700 can also be distributed amongst a plurality of networked computer processors. The smart lamp control logic 700 of the present embodiment begins at step 702.

At step 702, in an embodiment, the control logic 700 can represent an identifier of at least one LED strip. For example, the control logic 700 can receive electrical signals corresponding to the LED strips for a smart lamp. In an example, the LEDs can correspond to a collective electrical signal transmitted to the processor at a particular voltage. The particular voltage can correspond with a manufacturer of the LEDs. For example, a first manufacturer can provide LEDs with a threshold voltage lower than LEDs from a second manufacturer. For example, the control logic 700 can identify the LED strip based on an LED ID corresponding to each of the LED strips. In an example, the control logic 700 can include LED information corresponding to the LEDs present in the smart lamp. The control logic 700 can compare input signals from the LEDs to the LED information to identify the LED strips. The control logic 700 then proceeds to step 704.

At step 704, in an embodiment, the control logic 700 can transmit statuses of the at least one LED strip and DIP switch positions via power-line communications utilizing voltage feed lines powering a smart lamp. For example, the control logic 700 can identify the status of the LED strip based on an input from the LED strip including a binary representation of the status of the LED strip. In another example, the control logic 700 can identify a current state of the DIP switches. For example, the DIP switches can correspond to various states relating to a position of the smart lamp. In an example, the DIP switches can generate an electrical signal based on a mechanical position of the DIP switches, relating to the position of the smart lamp. For example, when the smart lamp is adjacent to another smart lamp system, the DIP switches can include a configuration representing the relative positions of the DIP switches. In an example, the DIP switches can indicate whether the smart lamp is to the left or to the right of a common reference position. The DIP switches can represent the position of the smart lamp by a position of one of the DIP switches. For example, when the smart lamp is on the left of the common reference position, one of the DIP switches can be in an up state, represented as a binary "1" in the corresponding electrical signal. The control logic 700 then proceeds to step 706.

At step 706, in an embodiment, the control logic 700 can monitor the voltage, current, and DIP switch arrangement. For example, the control logic 700 can monitor voltage, current, and DIP switch arrangement of the smart lamp. In an example, the control logic 700 can identify a value of the voltage based on power-line transmission between the P control logic 700 and a PLC receiver. The control logic 700 can identify a value of the current based on power-line transmission between the control logic 700 and the PLC receiver. The control logic 700 can identify positions of the DIP switches based on the electrical signal from the DIP switches. The electrical signal can include binary representation of the positions of the DIP switches. The control logic 700 then proceeds to step 708.

At step 708, in an embodiment, the control logic 700 can transmit lamp information to the power-line transceiver. For example, the lamp information can include the DIP switch positions and statuses of the LED strips. The control logic 700 then proceeds to step 710.

At step 710, in an embodiment, the control logic 700 can assign a smart lamp configuration based on the DIP switch arrangement. For example, the DIP switch arrangement can correspond with a physical position of the smart lamp in relation to other smart lamps. The control logic 700 then proceeds to step 712.

At step 712, in an embodiment, the control logic 700 can identify a status of the at least one LED strip. For example, the control logic 700 can identify which of the LED strips is operational. For example, the control logic 700 can receive inputs from each of the LED strips indicating an ID and a status of the LEDs. In an example, the control logic 700 can identify whether the LED strip is in an inoperable state based on the inputs from the LED strips. Alternatively, the control logic 700 can determine whether the LED strips are in an operable state. For example, the LED strips can transmit the inputs including a binary representation of the state of the LEDs. The control logic 700 can receive the inputs and classify the LED strips based on the states of the LED strips. In an example, the control logic 700 can identify which particular LEDs of the LED strips are inoperable. The control logic 700 then proceeds to step 714.

At step 712, in an embodiment, the control logic 700 can detect an activation failure. For example, the control logic 700 can identify a number of operational LED strips. In an example, when the number of the operational LED strips is below a threshold the characteristics monitoring can generate an alert as the activation failure. The threshold can include a ratio of the operational LED strips to a total number of LED strips. In an example, the threshold can include the ratio to be 50% of the total number of LED strips are operational. The activation failure can correspond to legal compliance with regulations for public safety. For example, the activation failure can correspond to a number of operational LED strips at a railway crossing.

The present disclosure achieves at least the following advantages:

1. Providing a lighting system with the ability to monitor various states of LEDs using a combination of power-line communications and electrical hardware.
2. Enabling efficient communications between the lighting system and a network using a communication protocol to monitor the states of LEDs.
3. Minimizing light failures by generating an alert in response to a state of the LEDs indicating LED inoperability.

Persons skilled in the art will readily understand that advantages and objectives described above would not be possible without the particular combination of computer hardware and other structural components and mechanisms assembled in this inventive system and described herein. Additionally, the algorithms, methods, and processes disclosed herein improve and transform any general-purpose computer or processor disclosed in this specification and drawings into a special purpose computer programmed to perform the disclosed algorithms, methods, and processes to achieve the aforementioned functionality, advantages, and objectives. It will be further understood that a variety of programming tools, known to persons skilled in the art, are available for generating and implementing the features and operations described in the foregoing. Moreover, the particular choice of programming tool(s) may be governed by the specific objectives and constraints placed on the implementation selected for realizing the concepts set forth herein and in the appended claims.

The description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f). Even under the broadest reasonable interpretation, in light of this paragraph of this specification, the claims are not intended to invoke 35 U.S.C. § 112(f) absent the specific language described above.

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the inventions can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification.

What is claimed is:

1. A smart lamp system, comprising:

a dual-inline package (DIP) switch configured to represent an identifier of a light-emitting diode (LED) strip;

a transceiver configured to transmit a status of the LED strip and a DIP switch position;

a processor operably coupled to the DIP switch, the transceiver, and the LED strip, and configured to assign a smart lamp configuration based on the DIP switch position, wherein the processor is further configured to indicate whether the LED strip is operating normally.

2. The smart lamp system of claim 1, wherein the DIP switch position corresponds to a unique identifier (ID) of the smart lamp, left or right position of the smart lamp, or establishes a time delay for message transmission.

3. The smart lamp system of claim 1, wherein the processor is further configured to generate a communication payload based on the status.

4. The smart lamp system of claim 1, wherein the status can be that the LED strip is operable or inoperable.

5. The smart lamp system of claim 1, wherein the processor is further configured to identify and transmit the statuses of a plurality of LED strips.

6. The smart lamp system of claim 1, further comprising a housing configured to house at least the LED strip, the processor, and the transceiver.

7. The smart lamp system of claim 1, wherein the processor is further configured to perform the step of detecting an activation failure.

8. The smart lamp system of claim 1, wherein the DIP switch includes a manual electric switch that is packaged with others in a group in a standard dual in-line package.

9. The smart lamp system of claim 1, wherein a first switch of the DIP switch corresponds to a physical position of the LED strip.

10. A method for configuring a smart lamp system:

representing an identifier of an LED strip;

transmitting a status of the LED strip and a dual-inline package (DIP) switch position via a transceiver; and assigning a smart lamp configuration based on the DIP switch position, indicating, via a processor, whether the LED strip is operating normally.

11. The method of claim 10, wherein the DIP switch position corresponds to a unique identifier (ID) of the smart lamp, left or right position of the smart lamp, or establishes a time delay for message transmission.

12. The method of claim 10, wherein the DIP switch can toggle between different positions to assign different values.

13. The method of claim 10, wherein the processor is further configured to generate a communication payload based on the status.

14. The method of claim 10, wherein the status can be that the LED strip is operable or inoperable.

15. The method of claim 10, wherein the processor is further configured to identify and transmit the statuses of a plurality of LED strips.

16. The method of claim 10, further comprising a housing configured to house at least the LED strip, the processor, and the transceiver.

17. The method of claim 10, wherein the processor is further configured to perform the step of detecting an activation failure.

18. The method of claim 10, wherein the DIP switch includes a manual electric switch that is packaged with others in a group in a standard dual in-line package.

19. The method of claim 10, wherein a first switch of the DIP switch corresponds to a physical position of the LED strip.

20. The method of claim 10, further comprising performing a self-diagnostic check.

* * * * *